F. L. WALKER & H. G. DITTBENNER.
BAND SAW MILL.
APPLICATION FILED JAN. 10, 1916.

1,207,103.

Patented Dec. 5, 1916.
2 SHEETS—SHEET 2.

Witnesses.
A. H. Opsahl
E. C. Skinkle

Inventors
Flecher L. Walker.
Hermann G. Dittbenner
By their Attorneys
Williamson Merchant

UNITED STATES PATENT OFFICE.

FLETCHER L. WALKER AND HERMANN G. DITTBENNER, OF MINNEAPOLIS, MINNESOTA.

BAND-SAW MILL.

1,207,103.   Specification of Letters Patent.   Patented Dec. 5, 1916.

Application filed January 10, 1916. Serial No. 71,207.

*To all whom it may concern:*

Be it known that we, FLETCHER L. WALKER and HERMANN G. DITTBENNER, citizens of the United States, residing at Minneapolis, in the county of Hennepin and State of Minnesota, have invented certain new and useful Improvements in Band-Saw Mills; and we do hereby declare the following to be a full, clear, and exact description of the invention, such as will enable others skilled in the art to which it appertains to make and use the same.

Our invention relates to band saw mills and has for its object to provide improved means for taking the boards from the saw as they are cut from the log, turning the same from vertical into horizontal positions, and delivering the same to the feed rollers of the mill.

Generally stated, the invention consists of the novel devices and combinations of devices hereinafter described and defined in the claims.

The invention is illustrated in the accompanying drawings wherein like characters indicate like parts throughout the several views.

Figure 1:
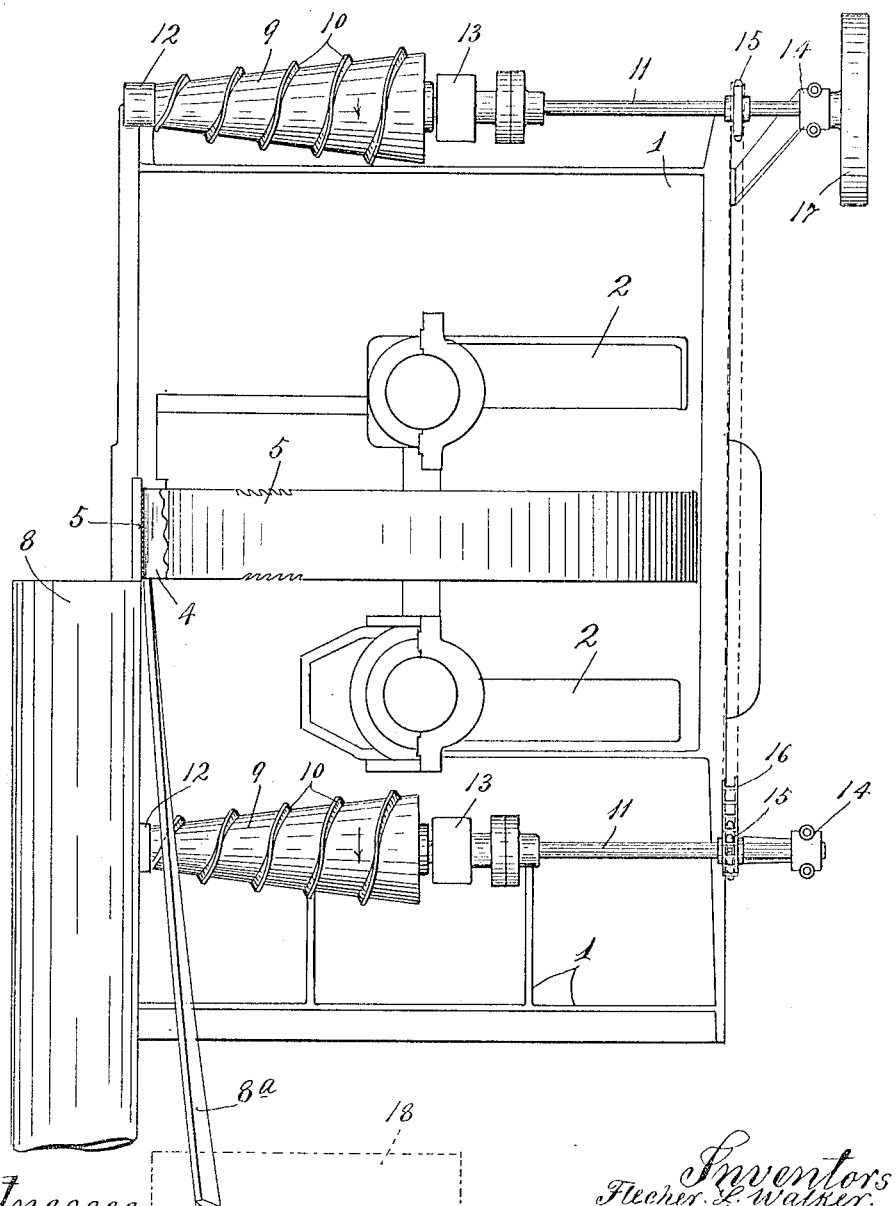

Referring to the drawings: Figure 1 is a plan view of a band saw mill showing our invention applied thereto, but with some of the parts of the mill removed and some indicated in diagram only; and Fig. 2 is a side elevation thereof, with some parts shown in section.

Of the parts of the band saw mill, the numeral 1 indicates the bed frame, the numeral 2 the frame pedestals, the numerals 3 and 4, respectively, the lower and upper band saw wheels and the numeral 5 the band saw. The log carriage, indicated as an entirety by the numeral 6 is arranged to run on the usual track 7. The numeral 8 indicates a log on the carriage 6. All of the said parts just noted may be of the usual or any suitable construction.

Figure 2:
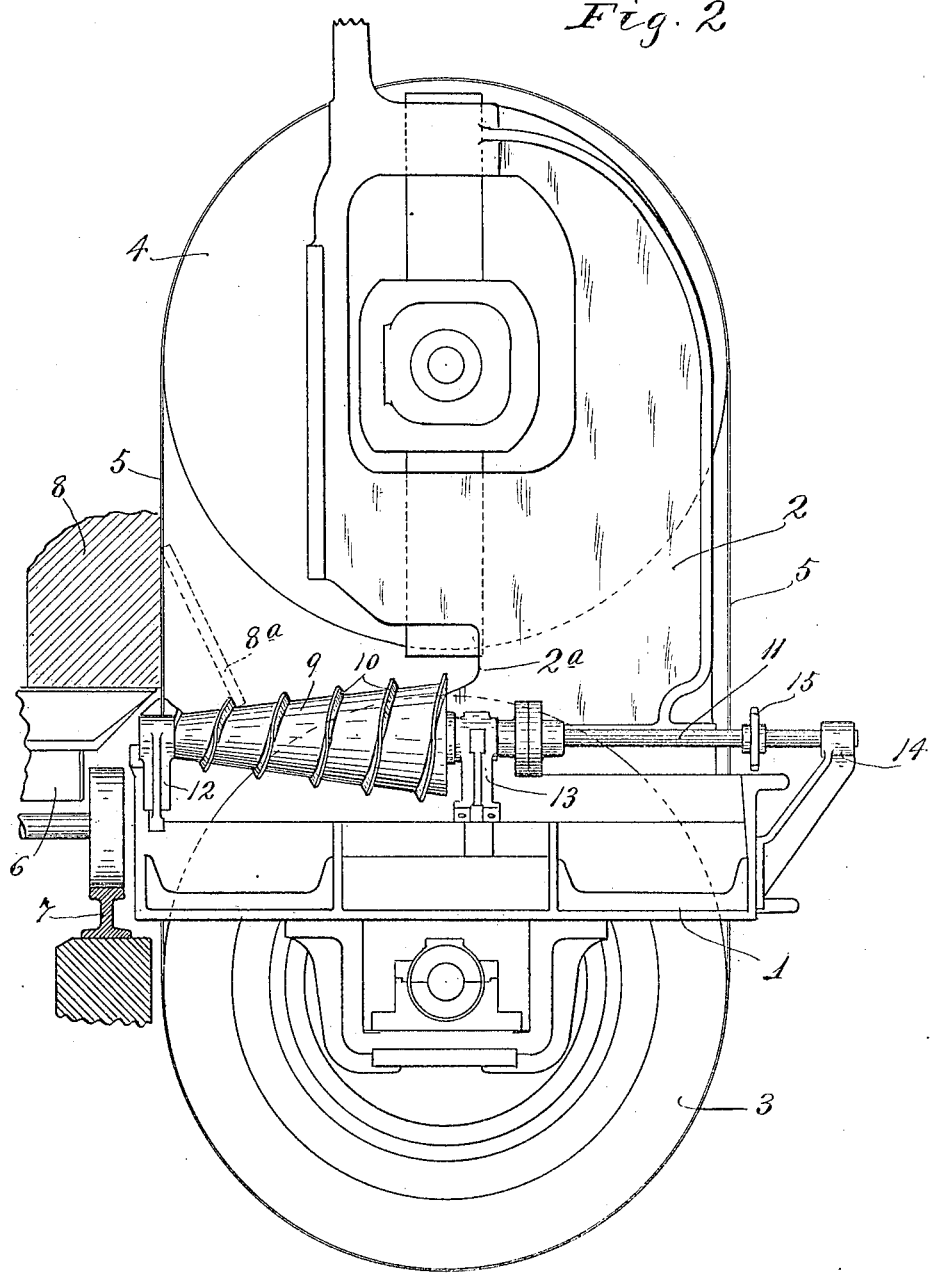

By reference to Fig. 2, it will be noted that the frame pedestals 2 are notched or cut back, at 2ª, between the upper and lower saw wheels 3 and 4 to points back of a vertical line intersecting the axes of the said upper and lower wheels. This gives clearance for very wide boards. A board just cut from the log 8 is indicated at 8ª, the same being shown by full lines in Fig. 1, and by dotted lines in Fig. 2.

In accordance with our invention, we provide so-called "haul-off" rollers 9 that are provided with spiral flanges or threads 10. These rollers 9 are horizontally located in parallel arrangement, one on each side of the saw and with their axes at a right angle to the line of travel of the log carriage 6. For an important reason, these rollers 9 are preferably made conical with their small ends extending outward or toward the log carriage. Furthermore, the said rollers are so located that the upper surface of the small outer ends are in planes slightly below the upper log-supporting surface of the log carriage, and the inclined upper surfaces of the said conical rollers lead into the recesses or notches 2ª of the pedestals 2, on lines that extend slightly above the upper surface of the lower saw wheel 3. The said rollers 9 are secured to shafts 11 journaled in suitable bearings 12, 13 and 14 on the bed frame 1. At their rear portions, the said roller shafts 11 are shown as provided with sprockets 15 over which a sprocket chain 16 is arranged to run. One of the said roller shafts has a pulley 17 over which a power-driven belt of the machine will run to impart rotary motion to the "haul-off" rollers 9 in the direction of the arrows marked thereon. This direction of rotation of the said "haul-off" rollers 9 serves to carry the boards 8ª onto the feed rollers 18 which latter, as is well known, serve to carry the boards endwise from the band saw mill.

As the carriage 6 moves back and forth past the saw, the boards will be cut from the logs and will drop edgewise down onto the small ends of the rollers 9 and the said rollers will impart to the boards dropped thereon a compound endwise and lateral movement. The endwise movement serves to carry the boards toward the feed rollers and the lateral movement imparted to the lower edges only of the boards, serves to turn the same gradually into horizontal positions, or in other words, to lay the same down approximately flatwise without permitting the violent dropping action, such as would be likely to crack the boards. Furthermore, this edgewise lateral movement given to the boards carries the same clear of the band saw wheels, and when the boards are wide, carries the same back into the notches 2ª of the pedestals 2 and keeps the boards always out of contact with said saw wheels even when the saw wheels are quite close together.

With the above described arrangement of the "haul-of" rollers, it is made possible to cut very wide boards from the log with a short band saw and with the band saw wheels close together.

What we claim is:

1. In a band saw mill, the combination with upper and lower saw wheels, and a band saw arranged to run over the same, of haul-off rollers with spiral threads in position to receive boards cut from the log by the said saw and operative to simultaneously move said board endwise and to move the lower edge thereof laterally inward away from the saw, thereby turning the said board into an approximately horizontal position.

2. In a band saw mill, the combination with the saw wheels and a band saw working thereon, of approximately horizontal conical haul-off rollers having spiral threads operative on the board cut from the log to move the same endwise and turn the same laterally into a horizontal position.

3. In a band saw mill, the combination with upper and lower saw wheels and a band saw working thereon, of a pair of approximately horizontal haul-off rollers, one on each side of said saw, having spiral threads operative on the boards cut from the log, and means for rotating the said two haul-off rollers in the same direction.

4. In a band saw mill, the combination with upper and lower saw wheels and a band saw arranged to run thereon, of a haul-off roller having a spiral thread, the upper portion of which works in an inclined plane slightly above the upper portion of said lower saw wheel.

5. In a band saw mill, the combination with a bed frame and pedestals, of lower and upper saw wheels having journals connected, respectively, to the said bed frame and pedestals, said pedestals having notches extending back beyond the vertical line intersecting the axis of said wheel journals, a band saw working on said upper and lower wheels, and a conical haul-off roller having a spiral thread, the upper portion of which works in an inclined plane extended slightly above the upper portion of said lower saw wheel.

In testimony whereof we affix our signatures in presence of two witnesses.

FLETCHER L. WALKER.
HERMANN G. DITTBENNER.

Witnesses:
E. G. SCAMMON,
C. W. BENNETT.

Copies of this patent may be obtained for five cents each, by addressing the "Commissioner of Patents, Washington, D. C."